United States Patent [19]

Matsuguchi et al.

[11] Patent Number: 4,721,638
[45] Date of Patent: Jan. 26, 1988

[54] STICKING MATERIAL FOR PREVENTING RESTICKING

[75] Inventors: Tadashi Matsuguchi, Suita; Noboru Matsuguchi, Ashiya, both of Japan

[73] Assignee: Daimatsu Kagaku Kogyo Co., Ltd., Osaka, Japan

[21] Appl. No.: 781,796

[22] Filed: Sep. 30, 1985

[30] Foreign Application Priority Data

Oct. 1, 1984 [JP] Japan .................. 59-206770
Nov. 12, 1984 [JP] Japan .................. 59-238085

[51] Int. Cl.⁴ .............. C09J 7/02; B32B 3/10
[52] U.S. Cl. ................... 428/40; 156/239; 156/240; 428/41; 428/42; 428/138; 428/201; 428/202; 428/207; 428/211; 428/343; 428/352; 428/354; 428/913; 428/914
[58] Field of Search ........... 428/202, 198, 352, 42, 428/43, 40, 41, 349, 354, 343, 914, 138, 913, 211, 201, 207; 156/239, 240

[56] References Cited

U.S. PATENT DOCUMENTS

| | | | |
|---|---|---|---|
| 3,312,005 | 4/1967 | McElroy | 428/42 X |
| 3,508,754 | 4/1970 | Shorin | 428/43 X |
| 3,592,722 | 7/1971 | Morgan | 428/198 |
| 3,936,570 | 2/1976 | Iwata | 428/349 |
| 3,985,602 | 10/1976 | Stuart | 428/202 X |
| 4,275,106 | 6/1981 | Watanable | 428/202 X |
| 4,577,205 | 3/1986 | Shibata et al. | 428/202 X |

Primary Examiner—Thomas J. Herbert
Attorney, Agent, or Firm—Birch, Stewart, Kolasch & Birch

[57] ABSTRACT

A sticking material for preventing resticking having an adhesive layer, a second layer laminated on one main surface of the adhesive layer, a peeling agent layer laminated on the second layer and a first layer laminated on the peeling agent layer. The following equation, $$a < b$$

is satisfied, wherein the force required to separate the first layer from the second layer at the peeling agent layer is denoted as a, and the adhesive force of the adhesive layer with the surface of the second layer is represented by b. Since the second and first layers are adhered temporarily via the peeling agent layer, the first layer once separated from the second layer, cannot be restuck.

15 Claims, 14 Drawing Figures

STICKING MATERIAL FOR PREVENTING RESTICKING

BACKGROUND OF THE INVENTION

1. Field of the Invention

The present invention relates to a sticking material for preventing resticking, and, in particular, to a sticking material of packages for preventing resticking used, for example, as a price tag and a label stuck on the opening of a package.

2. Description of the Prior Art

Labels for preventing resticking used as price tage or the like, wherein suitable sewing stitches or cuts are provided on the base surface material, so that when any attempt is made, for example, in the shop to tear off the label and replace it with the other price tag, the label will separate and tear on the stitches or cuts, and such attempt can be distinguished by looking, have been known up to now.

A sticker placed on the opening of a package for indicating a sealed state can be easily removed for example, by picking up goods displayed on the shelves in the shop, depending on the material of the package opening and the surface treatment thereof, and restuck after placing foreign objects into the package, without it being noticed that the label was removed. Thus it is difficult to tell whether the package was opened just by externally examining the sticker. Therefore, there is a possibility that the contents of a package will be tampered with, for example, toxic substances will be added thereto.

Accordingly, recently, stickers sensitive to separation after adhesion have been introduced into the market.

The sticker comprises a film, and a silicon layer, having a vaporized metal layer on the surface which, is formed partly on the reverse side thereof. Thus, a part of the metallized layer is interposed by the silicon layer and is not metallized directly on the film. In addition, on the surface of the metallized layer, a pressure sensitive adhesive layer is formed, and a release sheet is adhered temporarily thereto.

The sticker is applied to the opening of the package by pressing the exposed surface of the adhesive layer after removing the release sheet. Then, when the sticker stuck on the opening is torn off, only the part of the metallized layer which was not metallized directly onto the film due to the silicon layer, remains as sticking on the opening, by the adhesive layer. Meanwhile, when the opening is unsealed, the metallized layer stuck and remained thereon will be cut or torn, and thereby the unsealed state can be distinguished.

However, such stickers have a disadvantage of their high cost, because the film is the material being metallized, and is limited to polyester or the like In addition, various other conditions must be satisfied, as the metal is vaporized on the surface and the silicon layer. Moreover, there were also such disadvantages and sanitary problems as the attachment of dusts on the sticky surface of the exposed adhesive layer, caused by part of the adhesive layer remained on the sticking portion of the material being stuck, when the film is torn off.

SUMMARY OF THE INVENTION

Therefore, a principal object of the present invention is to provide a sticking material, which is sensitive to separation after adhesion and does not require any vaporizing process.

The present invention comprises a sticking material comprising an adhesive layer, a second layer laminated on one main surface of the adhesive layer, a peeling agent layer laminated on the second layer and a first layer laminated on the peeling agent layer by coating a resin.

A peeling agent layer facilitates the separation between the second and the first layers.

According to the present invention, the second layer is laminated on the first layer by means of coating and so on, and thus it can be formed without the vaporization process as in the past. In addition, since the first and second layers are temporarily adhered in the state whereby resticking is impossible via the separation layer, when any attempt is made to tear the sticking material off from the opening of the package, the first layer will release from the second layer and the resticking thereof is hardly possible. Thus, it is clear that the sticking material had been torn off. Furthermore, when the second layer has been cut or torn, since it will not return to the original state, the separation of the second layer can be distinguished. Thus, the separation of the sticking material can be clearly seen by external examination, and the sticking material without the vaporization process used hitherto may be obtained.

BRIEF DESCRIPTION OF THE DRAWINGS

The present invention will become more fully understood from the detailed description given hereinbelow and the accompanying drawings which are given by way of illustration only, and thus are not limitative to the present invention, and wherein.

DESCRIPTION OF THE PREFERRED EMBODIMENTS

Figure 1:
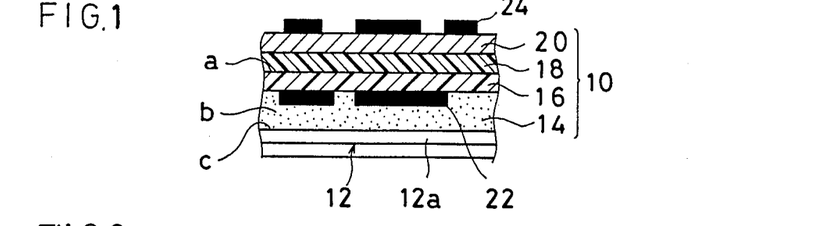
FIG. 1 is a cross-sectional view showing one embodiment of the present invention.

FIG. 1 is a cross-sectional view of a label of one embodiment of the present invention. The label 10 of this embodiment is attached temporarily on a release sheet 12 and formed by an adhesive layer 14, a resin layer 16 as a second layer, peeling agent layer 18 and a surface layer 20 as a first layer, which are laminated successively. Then, a printed layer 24 is formed on the first layer 20, and a printed layer 22 is also formed on the surface on the side of the resin layer 14 of the second layer 16.

The adhesive layer 14 provides the adhesive power to the label 10 and can be an adhesive, for example, such as a pressure sensitive adhesive, and formed between the release sheet 12 and the resin layer 16.

The resin layer 16 is for sealing, for example, an opening of a package and producing an unsealed state by cutting and tearing, when the sealed portion is unsealed. The resin layer 16 is formed by coating a urethane resin, EVA resin and other resins such as PVA, vinyl chloride-vinyl acetate and acrylic on the peeling agent layer 18. Meanwhile, as another example of the resin layer 16, a resin layer formed so as to be readily cut and torn by a relatively weak force, for example, a resin layer coated with a synthetic resin formed by the mixed melting of metal powder therein, may be used.

The peeling agent layer 18 is formed so as to facilitate the separtion of the resin layer 16 and the film layer 20, whereby resticking is impossible, and constituted by coating peeling agents such as a silicon resin, fluororesin and wax, and formed between the resin layer 16 and the surface layer 20.

The surface layer 20 is formed to protect the resin layer 16 from cutting and tearing, and attached temporarily to the resin layer 16 via the peeling agent layer 18. Meanwhile, as an example of the surface layer 20, for example, paper, synthetic paper, film or an aluminum foil may be used, of which a relatively soft material, whereby the surface layer 20 will not spearate by restoring to the original state against the adhesive power of the resin layer 16, when the label is bent and applied to the sealed portion, is suitable.

The release sheet 12 protects the adhesive layer 14 and includes peeling paper consisting of, for example, paper and a synthetic resin sheet. In the peeling paper, a release agent layer 12a duplicate-coated with a peeling agent, for example, such as silicon, is formed on the surface of the base material such as paper and so on.

The label 10 is constructed such that forces required to separate respective portions satisfy the equations $c < a < b$, wherein the force required to separate the surface layer 20 from the resin layer 16 at the peeling agent layer 18 is represented by a, the adhesive force between the adhesive layer 14 and the material being stuck is represented by b, and the force required to separate the release sheet 12 from the adhesive layer 14 is denoted as c.

Figure 8:
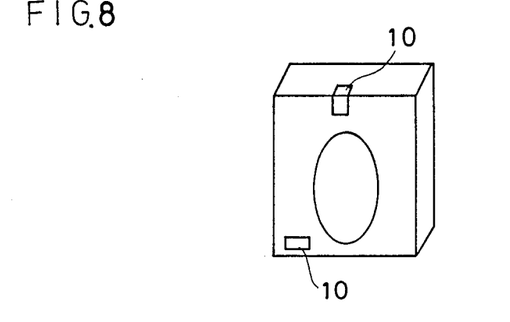
FIG. 8 is a perspective view showing application of a label in accordance with the present invention.

First, the label 10 is separated from the release sheet 12 and applied, for example, as a price tag or applied on the opening of the cake package by the adhesive layer 14 as shown in FIG. 8.

In order to open the package stuck with the label 10, constructed by the surface layer 20 and the resin layer 16 and so on, the label 10 must be removed to unseal the sealed portion. In this case, since the surface layer 20 is weakly adhered to the resin layer 16 temporarily via the peeling agent layer 18 while the resin layer 16 is adhered firmly to the opening of the package by the adhesive layer 14, when any attempt is made to tear off the label 10, only the surface layer 20 is separated and the resin layer 16 will remain on the sealed portion together with the adhesive layer 14. Accordingly, the surface layer 20 once removed can never be restuck on the resin layer 16, and restoration to the original state is not really possible. Thus, the unsealed state is obvious at a glance.

Then, for unsealing the opening of the package completely, the resin layer 16 remaining without being removed, must be cut or torn, or separated from the opening.

In case the resin layer 16 has been cut or torn simultaneously, when tearing off the surface layer 20 to open the sealed portion, the sealed state can be distinguished at a glance on the state of the resin layer 16 similarly as mentioned above.

Meanwhile, in this embodiment, although the label 10 was applied on a cake package, it is understood that other applications on medicine packages, envelops, portions of bags being sealed and price tags indicating prices, are also possible.

Figure 2:
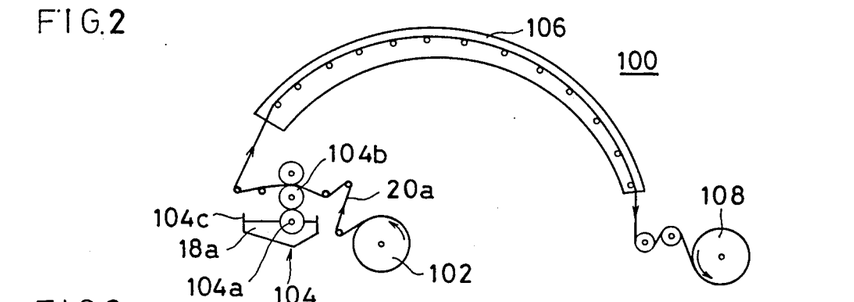
FIGS. 2 and 3 are views showing an example of the apparatus for producing a laminate, used in the embodiment in accordance with the present invention.
Figure 3:
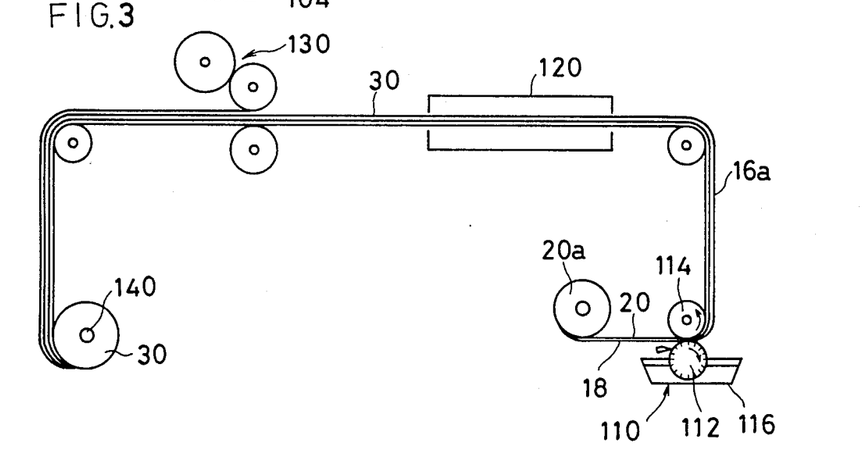

FIGS. 2 and 3 are views showing an example of the apparatus for producing a laminate used in accordance with the present invention.

The laminate 30 is formed by laminating a peeling agent layer 18 and a resin layer 16 on a surface layer 20, in that order.

An apparatus 100 comprises a retaining roller 102 for retaining a surface material 20a forming the stripped surface layer 20 in roll. The surface material 20a retained by the retaining roller 102, is unrolled at one end and guided to a peeling agent coater 104.

The peeling agent coater 104 is for duplicate-coating the peeling agenet 18a, for example, such as a silicon resin and a fluororesin, onto the surface or the reverse side of the surface material 20a, and includes two rollers 104a and 104b. The roller 104a is dipped into a pan 104c holding the peeling agent 18a at the lower portion thereof. Thus, by rotating the rollers 104a and 104b, the peeling agent 18a is duplicate-coated onto the surface material 20a guided therebetween. As the peeling agent coater 104, a photogravure roller coater or a reverse roller coater and so on may be used, or a well-known printing machine such as an offset printer or a screen printer may also be used.

Then, the surface material 20a duplicate-coated with the peeling agent 18a, is fed, for example, to a dryer 106 including a heater. In the dryer 106, the peeling agent 18a duplicate-coated on the surface material 20a is dried and formed as the peeling agent layer 18. The surface material 20a formed with the peeling agent layer 18 as such, is guided to a winder 108.

The roller surface material 20a is mounted on a separate laminating apparatus 110 of a resin 16a, shown in FIG. 3.

The laminating apparatus 110 includes two rollers 112 and 114. The roller 112 is dipped into a pan 116 holding the resin 16a, such as a urethane resin or an EVA resin at the lower portion thereof. Thus, by rotating the rollers 112 and 114, the resin 16a is duplicate-coated onto the peeling agent layer 18 of the surface material 20a guided therebetween. Then, the surface material 20a coated with the resin 16a, is guided to a dryer 120 for drying and solidifying. Thereby, the resin 16a is coated on the peeling agent layer 18 on the surface material 20, and the base surface material 30 formed with the resin layer 16 thereon is formed, which is then sent to a printing apparatus 130. The printing apparatus 130 is constructed of a well-known printing machine, for example, such as an offset printer and arranged in a transferring line of the base surface material 30. Then a printed layer 22 printed with a message, for example, such as "unsealed" on the surface of the resin layer 16 by the printing apparatus 130, is formed.

The base subject material 30 formed with the printed layer 22 as such, is wound and retained by a winding roller 140 in roll.

Figure 4:
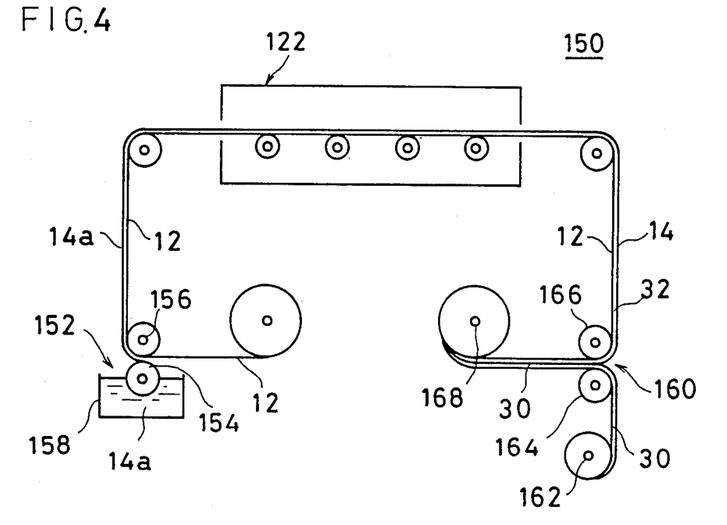
FIG. 4 is a view showing an example of the apparatus for further laminating an adhesive layer 14 and a release sheet 12, by using a base surface material 30 shown in FIG. 3.

FIG. 4 is a view showing an example of the apparatus for further laminating the adhesive layer 14 and the release sheet 12 by using the base surface material 30 shown in FIG. 2.

An apparatus 150 comprises a coater 152.

The coater 152 coats an adhesive 14a onto the surface of the release sheet 12, and includes a main roller 154 and a roller 156 disposed opposite thereto. The main roller 154 is dipped into a pan 158 holding the adhesive 14a at the lower portion thereof, whereby the adhesive 14a is coated on the surface of the release agent layer 12a of the release sheet 12 held between the main roller 154 and the roller 156.

Then, the release sheet 12 duplicate-coated with the adhesive 14a is led, for example, to a dryer 122 including a heater. In the dryer 122, the adhesive 14a duplicate-coated on the release sheet 12 is dried and formed with the adhesive layer 14. The release sheet 12 formed with the adhesive layer 14 is guided to a laminating apparatus 160 of the base surface material 30.

The laminating apparatus 160 is for laminating the base surface material 30 on the adhesive layer 14 of the laminate of the release sheet 12 and the adhesive layer 14, and includes a retaining roller 162 for retaining the rolled base surface material 30. The rolled base surface material 30 retained is unrolled at the one end, and fed between rollers 164 and 166. At this time, between the rollers 164 and 166, the laminate 32 coated wtih the adhesive 14a is guided therethrough. Therefore, the base surface material 30 and the release sheet 12 are laminated with the adhesive layer 14 sandwiched therebetween. Thus, the base surface material 30 laminate with the laminated 32 composed of the release sheet 12 and the adhesive layer 14 is led to a winding roller 168.

Figure 5:
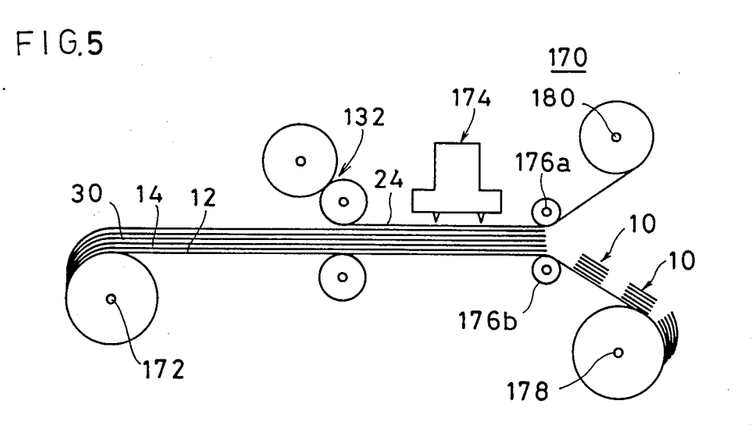
FIG. 5 is a view showing an example of the apparatus for producing a label.

Then, the base surface material 30 laminated with the release sheet 12 by the adhesive layer 14, is guided to an apparatus for producing labels. FIG. 5 is an illustrated view of an example of the apparatus for producing the labels.

This apparatus 170 comprises a retaining device 172 for retaining the rolled base surface material 30, laminated with the release sheet 12 by the adhesive layer 14. The laminated material composed of the base surface material 30 and the laminate 32 and pulled out from the retaining device 172 is led to a printing device 132.

The printing device 132 also consists of a well-known printing machine as the printing device 130, for example, such as an offset printer. On the surface layer 20, a printed layer 24 printed with picture lines, for example, such as "trade name" printed by the printing device 132, is formed. The laminated material formed with the printed layer 24 as such is led to a stamping machine 174. The stamping machine 174 includes a so-called die cutter having a cutting blade, whereby cuts having a suitable shape are made on the surface layer 20, peeling agent layer 18, resin layer 16 and adhesive layer 14.

Meanwhile, the stamping machine 174 may be of the type using a roller with a cutting edge, namely a die roler.

The base surface material 30 including the surface layer 20 and so on with cuts, is divided into unnecessary portions and labels 10 (necessary portions) by rollers 176a and 176b, whereby the unnecessary portions are wound by a roller 180 in rolls, and labels 10 (necessary portions) are wound by a winding roller 178 in a roll, as being attached temporarily on the release sheet 12.

In place of the stamping machine 174 and the winding roller 178, a cut forming machine having cutting blades may be used. The cutting blades are for providing cuts on the surface layer 20, peeling agent layer 18, resin layer 16 and adhesive layer 14 for separating in an individual label 10.

Here, the description will be made more specifically as follows:

(1) As the first layer, paper of fine quality having a thickness of approximately 70$\mu$ is used, whereon a silicon resin by Toray Industries, Ltd. used as the peeling agent forming the peeling agent layer, is coated together with a curing agent and baked in the dryer to form the peeling agent layer. Then, a urethane resin by Takeda Chemical Industries, Ltd. forming the second layer is coated onto the peeling agent layer to a thickness of about 5–50$\mu$. At this time, the force (a) required to separate the urethane resin from the peeling agent layer was 70 g. On the basis of a double layer product of the first and second layers prepared in such a manner, an acrylic adhesive (BPS-5127) by Toyo Mgf. Co., Ltd. is coated on separation paper by Shikoku Paper Co. to a dried film thickness of 5–50$\mu$ to form the release sheet, which is then stuck together with the double layer product. At this time, the force (c) required to tear off the release paper from the adhesives was 10 g. The pressure sensitive adhesive paper prepared in such a manner was made into labels, and stuck on the materials being stuck (paper boxes, plastic and glass bottles, etc.). At this time, the adhesive force (b) to the material being stuck was 1,500 g. When attempting to tear off the stuck label from the material being stuck forcibly, the paper of the first layer was torn off first.

(2) As the first layer, coated paper having a thickness of about 70$\mu$ is used, and a wax as the peeling agent forming the peeling agent layer was coated and dried. Then, the urethane resin or EVA resin and so on forming the second layer was coated on a wax to the thickness of about 5–50$\mu$. At this time, the force (a) required to tear off the urethane resin or EVA resin from the wax surface was 100 g. The double layer product of the coated paper and the second layer prepared in such a manner, was pasted together with the release sheet formed by coating the adhesives on the release paper to a thickness of 5–50$\mu$, as the base material. At this time, the force (c) required to detach the release paper from the adhesives was 10 g. The pressure sensitive adhesive paper prepared in such a manner, was made into labels and placed onto the materials being stuck (paper boxes, plastic and glass bottles, etc.). The adhesive force (b) to the materials being stuck at this time was 1500 g. When attempting to tear off the attached label forcibly from the material, the paper of the first layer was torn off first.

Figure 6:
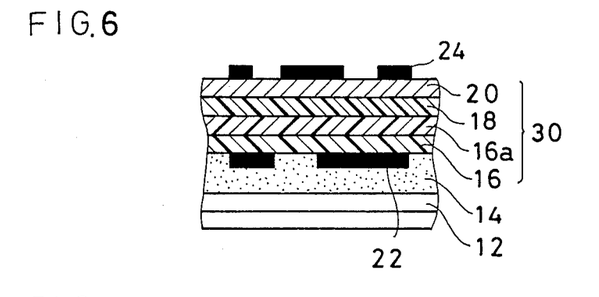
FIG. 6 is a cross-sectional view showing another embodiment in accordance with the present invention.

FIG. 6 is a cross-sectional veiw of another embodiment in accordance with the present invention. The label 10 of this embodiment is not formed by coating the resin layer 16 forming the second layer onto the separation layer 18. Instead, the layer 16 is laminated and adhered on the peeling agent layer 18, with the adhesive force of the adhesive layer 16a formed on the resin layer 16.

The resin layer 16 is formed by a film consisting of resins, such as polyethylene, polypropylene, polystyrene, urethane and so on, and the adhesive layer 16a is formed with an adhesive layer 16a having a weaker adhesive force than the adhesive layer 14 laminated on the peeling sheet 12.

Figure 7:
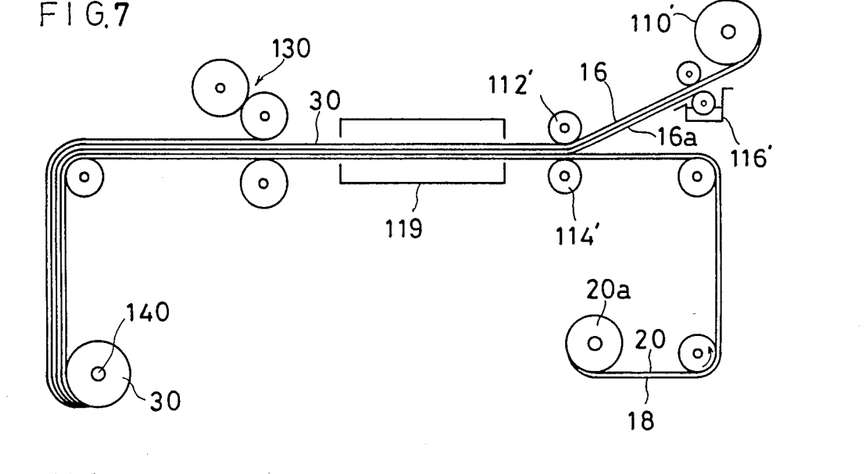
FIG. 7 is an illustrated view showing an example of the apparatus for producing a base surface material 30 constituted by a surface layer 20, a peeling agent layer 18 and a resin layer 16 shown in FIG. 6, by using the laminate of a surface layer 20 and a peeling layer 18 shown in FIG. 1.

FIG. 7 shows an example of the apparatus for producing the base surface material 30, composed of the surface layer 20, the peeling agent layer 18 and the resin layer 16 shown in FIG. 6, by using the laminate of the surface layer 20 and the peeling agent layer 18 shown in FIG. 2.

In the apparatus (shown in FIG. 7), different from the apparatus shown in FIG. 3, in place of the laminating device 110 for coating the resin 16a, a laminating device 110' is disposed for laminating the film 16 on the peeling agent layer 18 of the surface layer 10.

The laminating device 110' comprises means for mounting a roll to be rolled with the film 16, and the film 16 pulled out from the roll, is guided to an adhesive coater 116' including two rollers and a pan for holding the adhesive 16a, and fed between two rollers 112' and 114' arranged next, after being coated with the adhesive 16a on the surface thereof by the rotation of the two rollers, and then laminated on the peeling agent layer 18 of the surface layer 20 guided separately, with the adhesive layer 16a on the surface thereof, and led to an adhesion device 119. As the adhesion device 119, when adhesives containing water-soluble resins such as a PVA group, a vinyl acetate group, an acrylic group and so on or solvent type adhesives consisting of vinyl chloride-vinyl acetate, urethane, acrylic and so on, are used as the adhesives 16a, a "dryer" is used, and when hot-melt type adhesives of a rubber group and an EVA group are used, a "cooler" is used.

Figure 9:
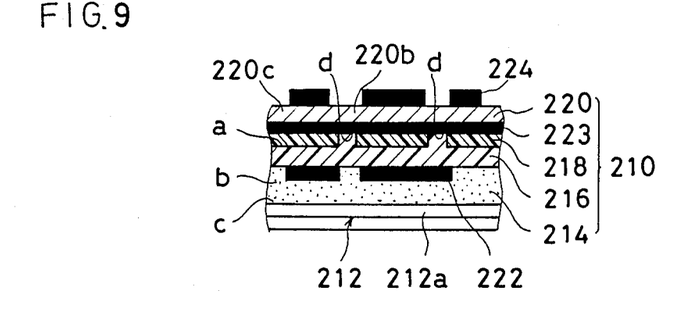
FIG. 9 is a cross-sectional veiw showing a separate embodiment in accordance with the present invention.

FIG. 9 is a cross-sectional view of another embodiment according to the present invention. A sticking material 210 of the embodiment is used as labels or the like, and adhered temporarily on a release sheet 212 with release agent layer 212, and formed by an adhesive layer 214, a resin layer 216 as a second layer, a peeling agent layer 218 and a surface layer 220 as a first layer laminated successively. On the surface of the surface layer 220, a printed layer 224 is formed, and also on the side of the adhesive layer 214 on the resin layer 216, a printed layer 222 is formed. In this embodiment, on the main surface of the surface layer 220 on the side of the peeling agent layer 218, a solid printed layer 223 such as silver printing is formed. Thus, the suppression is further increased by the printed layer 223, and seeing through the printed layer 222 from the side of the surface layer 220 becomes difficult. Moreover, by forming the printed layer 223, the surface layer 220 will be filled and film stability of the peeling agent layer 218 may be attained. In fact, printed layers 222, 223 and 224 may be formed individually or in more than two layers, or totally without.

Figure 12:
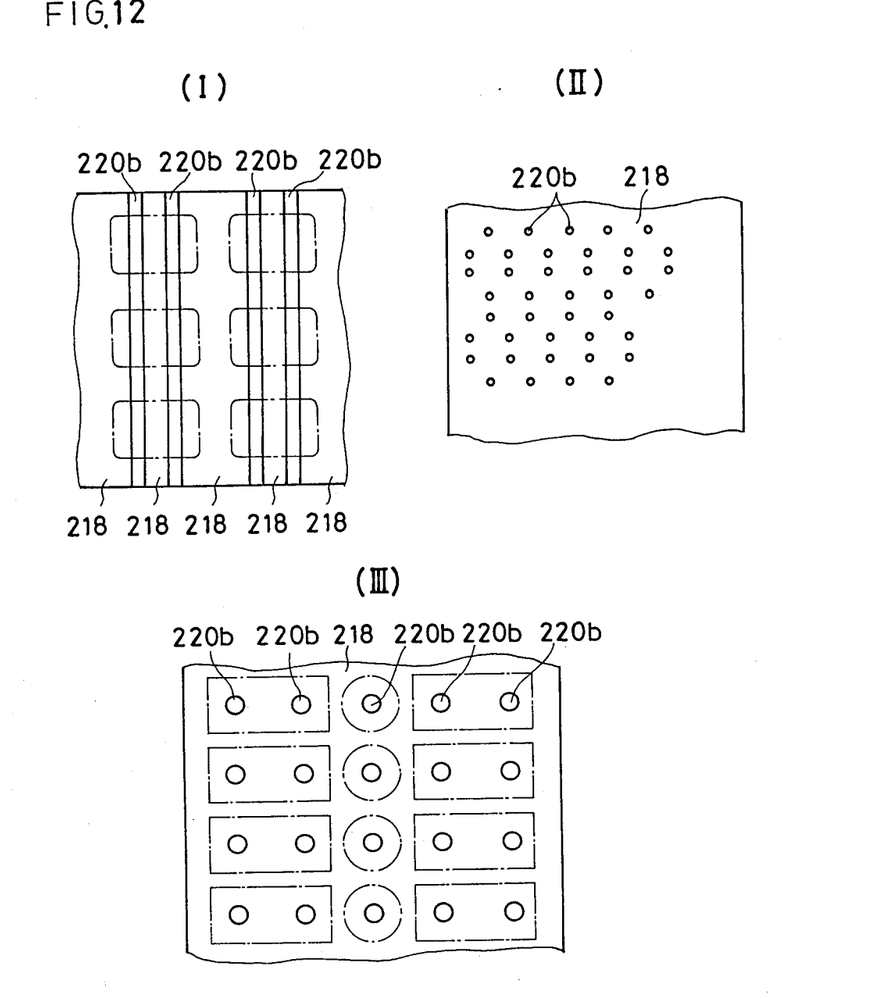
FIG. 12 I, II and III are a plan view showing a forming state of a peeling agent layer.

In this embodiment, the peeling agent layer 218 is formed not throughout one main surface of the surface layer 220, but as shown in FIG. 12 (1), uncoated portions of the peeling agent are formed with fixed intervals, whereat the resin layer 216 is adhered to the surface layer 220.

The surface layer 220 is formed to protect the resin layer 216 from cuts and tears, and also to be torn off first, when any attempt is made to remove the sticking material 210. Although the surface layer 220 is adhered temporarily on the resin layer 216 via the peeling agent layer 218, the one which tends to tear as leaving the portions where the peeling agent layer 218 is not formed, and laminated directly on the resin layer 216, on the side of the resin layer 216, when the surface layer 220 has been torn off, is used. For example, paper, a synthetic resin film represented by a brittle film made by mixing a filler pigment (e.g. titanium white and calcium carbonate) with copolymerized resins of vinyl chloride and acryl, or a sheet having a property of breaking easily by hands, such as an aluminum foil and so on, may be used. Among which, those having a relatively flexible property so as not to be separated by the surface layer 220, restoring to the original state against the adhesive power of the resin layer 218, when the sticking material 210 is bent and stuck on the sealed portion, are suitable.

Meanwhile, the sticking material 210 is constituted so that forces required to separate respective portions satisfy the equation $b > d > a > c$, wherein the force required to separate the surface layer 220c from the resin layer 216 at the position peeling agent layer 218, is represented by a, the force required to separate the surface layer 220b from the resin layer 216 at the position other than where the peeling agent layer 218 is laminated, is denoted as d, the adhesive force of the adhesive layer 214 against the material being stuck when it is adhered thereto is represented by b, and the force required to separate the release sheet 212 from the adhesive layer 214, is given as c.

Figure 11:
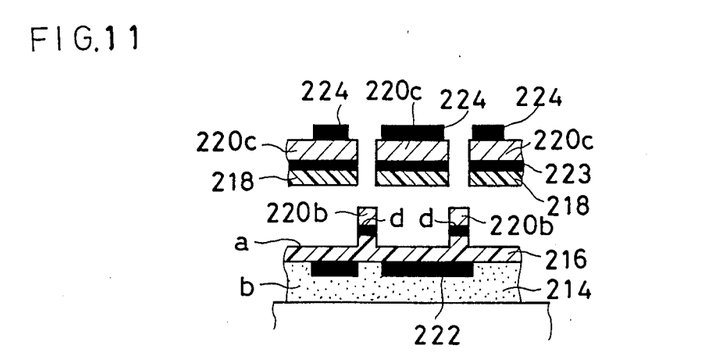
FIG. 11 is a cross-sectional veiw showing a segmented state of a first layer of the embodiment shown in FIG. 9.

In order to open the package stuck with the sticking material 210, the sticking material 210 stuck thereon must be removed to open the sealed portion. In this case, it is divided into a portion 220c, where the surface layer 220 is weakly adhered temporarily to the resin layer 216 via the peeling agent layer 218, and a portion 220b, where the surface layer 220 is firmly stuck as comapred with the former (position of the peeling agent layer 218), due to the absence of the peeling agent layer 218. Since the resin layer 216 is firmly stuck onto the sealed portion of the package with the adhesive layer 214, as shown in FIG. 11, when attempting to tear off the sticking material 210, only the surface layer 220c of the surface layer 220 with the peeling agent layer 218 can be removed. The other surface layer 220b will remain on the sealed portion together with the resin layer 216, by the adhesive layer 214. Accordingly, when the surface layer 220 has been removed once the surface layer 220c will be torn and the letter, such as the picture line "unsealed" on the printed layer 222 can been seen through the resin layer 216, and resticking the surface layer 220c on the resin layer 216 and restoring to the original state are not really possible. Thus, the unsealed state can be recognized at a glance.

In the meantime, as shown in FIG. 12 (I), the peeling agent 218 is coated in such a way as to leave narrow strips of uncoated area, so that coated and uncoated portions are formed alternately.

When forming a solid printed layer 223 on the main surface of the surface layer 220 on the side of the peeling agent layer 218, printing must be made before forming the peeling agent layer 218.

According to the present invention, portions where the second and first layers are adhered temporarily via the peeling agent layer in a state, whereby resticking is impossible, and portions where the first and second layers are stuck without the peeling agent layer are divided. Therefore, when attempting to tear off the label formed in a fixed shape from the opening of the package by hand, the first layer will be separated from the second layer at positions where the peeling agent layer is present, while at positions where the peeling agent layer is absent, the first layer will not be separated from the second layer, but will be cut or torn by itself. Thus the resticking is hardly possible. Accordingly, it is obvious that the label stuck to the material being stuck has been torn off. Furthermore, when the second layer has been cut or torn, restoring to the original state is not really possible, and thus the separation of the second layer can be recognized. Accordingly, the separation of the label stuck on the material being stuck is obvious at a glance, In addition, the label can be produced without using the vaporizing process required in the past.

A description will be made on the specific example as follows, (1) As the first layer, paper of fine quality having a thickness of about 70μ is used, whereon a silicon resin by Toray Industries, Inc. used as the peeling agent forming the peeling agent layer, is coated entirely together with a curing agent so as to leave polka dot uncoated portions, and baked in the dryer to form the peeling agent layer. Then, an EVA resin in the following Table 1 forming the second layer is coated on the peeling agent layer to the thickness of about 5–50μ. At this time, the force (a) required to separate the EVA resin from the peeling agent layer was 100 g, and the force (d) required to separate the EVA resin from the paper at the position, where the peeling agent layer is not formed, was 500 g. On the basis of the double layer product of the first and second layers prepared in such a manner, an acrylic adhesive (BPS-5127) by Toyo Ink Co. is coated on release paper by Shikoku Paper Co. to the dried film thickness of 5–50μ to form the release sheet, which is then stuck together with the double layer product. At this time, the force (c) required to tear off the release paper from the adhesives was 10 g. The pressure sensitive adhesive paper prepared in such a manner, was made into labels and stuck on the materials being stuck (paper boxes, plastic and glass bottles, etc.). At this time, the adhesive force (b) to the material being stuck was 1,000 g. When attempting to tear off the stuck label from the material being stuck forcibly, the paper of the first layer was separated at the position of the peeling agent layer and torn, as leaving the positions where the peeling agent layer is not formed, on the surface of the resin layer.

TABLE 1

| Components | | | | Composition (Parts) |
| --- | --- | --- | --- | --- |
| Ethylene vinyl-acetate co-polymer | Vinylacetate content | 10 | 50% | 20~50 |
| | Melt Index (MI) | 2 | 500 | |
| | Molecular weight | 10,000 | 100,000 | |
| Adhesion-dative resin | Rosin | | | 20~60 |
| | Hydrogenerated rosin glycerol-ester | | | (0~60) |
| | Polyterpene resin | | | |
| | Terepene-phenol resin | | | |
| | C5 group petroleum resin | | | |
| | C4 group petroleum resin | | | |
| | Alicyclic group hydrogenerated petroleum resin | | | |

TABLE 1-continued

| Components | | Composition (Parts) |
| --- | --- | --- |
| Wax, Oil | Paraffin wax | 5~50 |
| | Microwax | (5~70) |
| | Polyethylene wax | |
| | Polypropylene wax | |
| | Paraffin group, Naphtene group oils | |
| Heat stabilizer Aging preventing agent | | 0~1.5 |

Remark:
In place of ethylene vinylacetate copolymer resin, SIS SBS, polyisobutylene and polybutene may be used.

The same results were also obtained by coating the urethane resin by Takeda Chemical Industries, Ltd. as the second layer, with the other being the same as the foregoing examples.

(2) As the first layer, coated paper having a thickness of about 70μ was used, whereon a wax as the peeling agent forming the peeling agent layer was coated so as to form the stripped uncoated portions, and dried. Then, the urethane resin or EVA resin and so on forming the second layer, is coated on a wax to the thickness of about 5–50μ. At this time, a force (a) required to separate the urethane resin or EVA resin from the peeling agent layer was was 100 g, and the force (d) required to tear off the coated paper from the urethane resin at the positions where the peeling agent layer is not formed, was 500 g. The release sheet formed by coating the adhesive on the release paper to the dried film thickness of 5–50μ, was stuck together with the double layer product of the coated paper and the second layer prepared in such a manner, as the base material. At this time, the force (c) required to separate the separation paper from the adhesive was 10 g. The pressure sensitive adhesive paper prepared in such a manner was made into labels, and stuck on the materials being stuck (paper box, plastic and glass bottles, etc.). The adhesive force (b) to the material being stuck at this time was 1,000 g. When attempting to tear off the stuck label forcibly, the coated paper of the first layer has come off at the position of peeling agent layer and torn at the position where the peeling agent layer is not formed.

Meanwhile, FIGS. 12. (I), (II) and (III) show examples of the relationship between the peeling agent layer 218 formed, and labels (square or oval shapes, etc. shown by single dot lines) formed by die stamping the surface layer 220, the resin layer (film layer) 216 and the adhesive layer 214, when producing labels by using the sticking material in accordance with the present invention. In FIG. 12 (II), dotted portions lacking the peeling agent layer 218, are formed regularly on the straight flute lines with fixed intervals.

In FIG. 12 (III), positions lacking the peeling agent layer 218 are formed at each intersection of honeycomb lines, so as to be possible to stamp at any position when producing the labels by the die-stamping.

Figure 10:
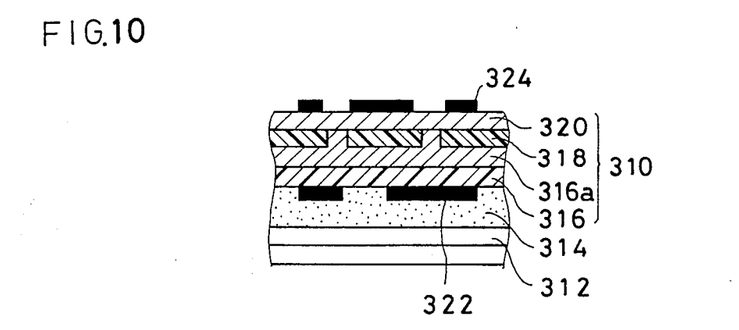
FIG. 10 is a cross-sectional view showing another embodiment in accordance with the present invention.

FIG. 10 is a cross-sectional view showing another embodiment in accordance with the present invention. The sticking material 310 of this embodiment is not formed by coating the resin layer 316 forming the second layer on the peeling agent layer 318, but laminated and adhered on the peeling agent layer 318, and the surface layer 320 at the positions where the peeling agent layer 318' is not formed, by the adhesive force of the adhesive layer 316a formed on the resin layer 316.

The resin layer 316 is formed by the film consisting of resins such as polyethylene, polypropylene, polystyrene and urethane and so on, and the adhesive layer 316a is formed by the adhesives having a weaker adhesive power than the adhesive layer 314 laminated on the release sheet 312.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sticking material for preventing resticking comprising:
   a resin second layer,
   a peeling agent layer formed on one main surface of said resin second layer,
   a surface first layer formed on said peeling agent layer, and
   an adhesive layer formed on another main surface of said resin second layer, in which the formula:

$a < d < b$ is satisfied,
   wherein (a) represents the force required to peel the surface first layer from said second layer where said peeling agent layer is present, (d) represents the force required to peel the surface first layer from said resin second layer where said peeling agent layer is absent, and (b) represents the adhesion between the adhesive layer and a material to be labeled.

2. The sticking material of claim 1, which further comprises a release sheet formed on the adhesive layer.

3. The sticking material of claim 1, wherein the resin second layer comprises a resinous film with a coating of a synthetic resin laminated thereon.

4. The sticking material of claim 1, wherein the peeling agent layer comprises a base material with a silicon resin coated thereon.

5. The sticking material of claim 1, wherein the surface first layer comprises a synthetic resin sheet.

6. The sticking material of claim 1, wherein the surface first layer comprises paper.

7. The sticking material of claim 1, wherein the surface first layer further has a printed layer formed thereon.

8. The sticking material of claim 1, which further comprises a printed layer formed between the resin second layer and the adhesive layer.

9. The sticking material of claim 1, wherein the resin second layer comprises a resinous film coated with a synthetic resin.

10. The sticking material of claim 9, wherein the synthetic resin is a urethane resin.

11. The sticking material of claim 9, wherein the synthetic resin is an EVA resin.

12. The sticking material of claim 1, wherein the peeling agent layer comprises excised portions.

13. The sticking material of claim 12, wherein said excised portions are formed linearly.

14. The sticking material of claim 12, wherein said excised portions are formed in dots.

15. The sticking material of claim 12, wherein said excised portions are formed in a geometrical pattern.

* * * * *